R. S. CLARY.
VEHICLE GUARD.
APPLICATION FILED JAN. 26, 1920.
1,347,937.
Patented July 27, 1920.
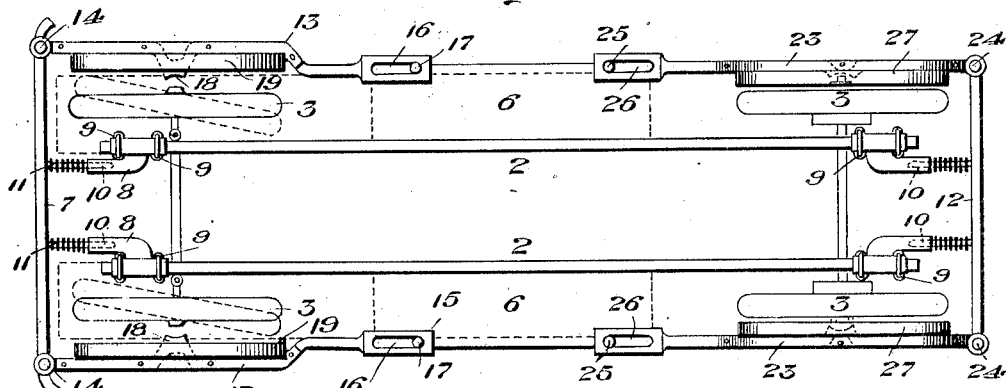
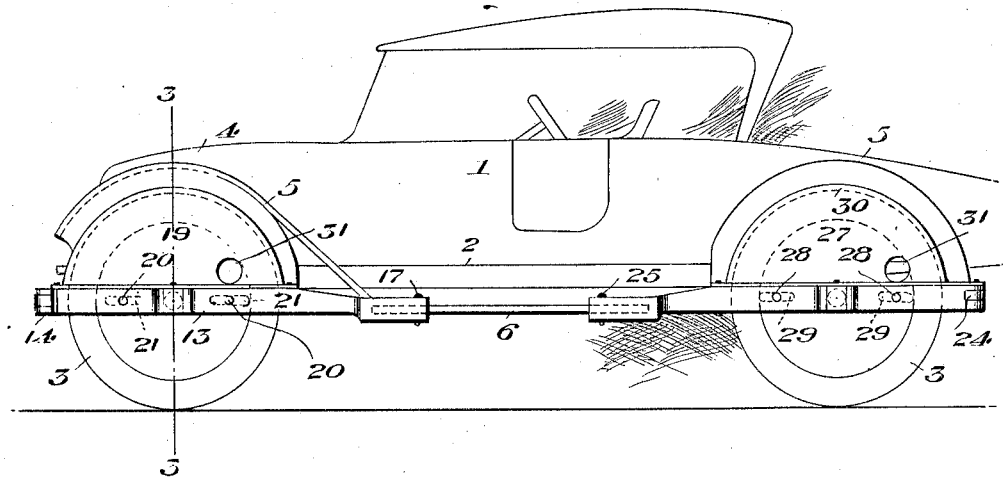
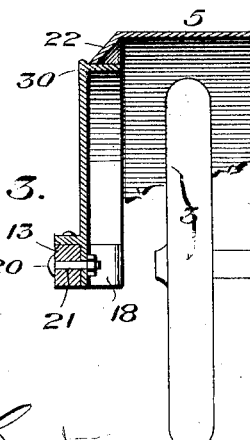

UNITED STATES PATENT OFFICE.

ROBERT S. CLARY, OF GREENSBORO, NORTH CAROLINA.

VEHICLE-GUARD.

1,347,937.        Specification of Letters Patent.     Patented July 27, 1920.

Application filed January 26, 1920. Serial No. 354,095.

*To all whom it may concern:*

Be it known that I, ROBERT S. CLARY, a citizen of the United States, residing at Greensboro, in the county of Guilford and State of North Carolina, have invented certain new and useful Improvements in Vehicle-Guards, of which the following is a specification.

My invention relates to protecting guards or fenders for vehicles, and is particularly adapted to automobiles, motor-cars, and the like.

The object of my invention is to prevent injury of the vehicle, especially on running-gear, radiator, or other projecting parts, in case the vehicle is in collision, the guards being so arranged as to fully protect the different parts, should they be struck from any angle.

In the accompanying drawings:—

Figure 1 is a top plan view;

Fig. 2 is a side elevation;

Fig. 3 is a transverse section on line 3—3 of Fig. 2.

1, indicates the body of the vehicle, which is provided with the running-gear frame 2, wheels 3, radiator 4, the mud-guards 5, and the running-board 6.

Extending across the machine in front of the forward wheels and projecting therebeyond is a bumper 7 resiliently secured to the running-gear frame 2 by sockets 8 suitably clamped thereto by the U-bolts 9.

Slidable within the socket and extending forwardly therefrom are stems 10, which are surrounded by a coil spring 11 interposed between the bumper 7 and the outer end of the socket 8, thereby yieldingly supporting the bumper.

Extending rearwardly of the rear wheels and transversely of the machine, is a similar bumper 12, which is secured to the machine in the same manner as the forward bumper by the sockets 8, stems 10 and springs 11. The ends of the rear bumper, however, are not curved as are the outer ends of the forward bumper.

Extending rearwardly from the forward bumper and parallel with the mud-guards, and in alinement with the hubs of the front wheels are guards 13, 13, being pivotally connected to the forward bumper as at 14. The rear ends 15 thereof are provided with elongated slots 16, which are adapted to receive pins or other suitable fastenings 17, extending through the running-board 6, the elongated slots permitting of slight rearward movement of the side guards to compensate for the rearward movement of the front guard. Extending inwardly and directly opposite the hubs of the wheels are impact members 18, which are of such a construction as to contact with the hubs proper, should the machine be struck from the side, thereby protecting the spokes of the wheels, or other parts thereof, in case of an accident.

19, indicates shields which are secured to the guards 13 by bolts 20 carried by the guards received in slots 21 arranged in the shields, which permits of a certain longitudinal movement relative to the guard and shield. These shields are provided around their periphery with inwardly-projecting flanges 30, as clearly shown in Fig. 3, which are adapted to pass beneath the edge of the mud-guard, fitting just snug enough to eliminate any rattle.

When it is desired to change the tires, or otherwise inspect the front wheels, the pin 17 is removed, and the guard and shield are swung outwardly upon their pivots 14 to clear the same, thereby rendering it possible to make an examination or any repairs to the wheels or running-gear.

Extending forwardly from the rear are similar guards 23, being pivoted as at 24 to the rear guard, and likewise secured at their forward ends to the running-board 6 by similar fastening means consisting of movable pins 25 received in the elongated slots 26 in the forward ends of the guards. Similar shields 27 are slidably secured to the rear guards by pins 28 passing through the slots 29 of the guards, permitting a certain longitudinal movement of the rear bumper without distorting the shields or mud-guards. The shield 27 is also provided with an inwardly-projecting flange 30 within the mud-guard as in the guards 19 of the front wheels, these rear and side guards likewise being capable of swinging outwardly when desired to make any repairs or other adjustment of the rear mechanism.

Openings 31 are provided in the rear of each of the shields 19, permitting of the application of a lock to the wheel, or the connection of air-hose to inflate the tire, without the necessity of removing the shield and guard for such purposes.

With the guard and fenders of the character above-described, it is apparent that it would be impossible for any vehicles coming together to lock their wheels one to the other in case of accident, and the liability of injury to the wheels, axles, steering-gear and projecting parts of the vehicle would be greatly reduced.

I claim:

1. A guard for vehicles comprising front and rear transverse bumpers resiliently secured thereto, and parallel side-guards pivoted to the bumpers and extending inwardly therefrom in close proximity to the wheels and detachably secured at their free ends to the sides of the vehicle.

2. A guard for vehicles comprising front and rear transverse bumpers yieldingly secured to the running-gear of the vehicle, and parallel side guards pivotally connected to the bumpers and detachably secured at their inner free ends to the running-board of the vehicle.

3. A guard for vehicles comprising front and rear transverse bumpers yieldingly secured to the running-gear of the vehicle, parallel side guards pivotally connected to the bumpers and detachably secured at their inner free ends to the running-board of the vehicle, and shields adapted to inclose a portion of the wheels secured to said side guards.

4. A guard for vehicles comprising front and rear transverse bumpers yieldingly secured to the running-gear of the vehicle, parallel side-guards pivoted for lateral movement to the bumpers and extending inwardly therefrom and detachably secured for longitudinal movement at the inner free ends of the running-board of the vehicle.

5. A guard for vehicles comprising front and rear transverse bumpers yieldingly secured to the running-gear of the vehicle, parallel side-guards pivoted for lateral movement to the bumpers and extending inwardly therefrom and detachably secured for longitudinal movement at their inner free ends to the running-board of the vehicle, the forward sets of side guards provided opposite the hubs of the wheels of the vehicle with impact members.

6. The combination with the running-gear of a vehicle, of front and rear transverse bumpers yieldingly secured for longitudinal movement thereof, parallel side-guards pivoted to the bumpers and capable of lateral movement and extending inwardly therefrom having their inner free ends detachably secured for longitudinal movement to the running-board of the vehicle, and shields carried by said side guards adapted to cover a portion of the wheels, said side guards capable of longitudinal movement relative to the shields.

7. The combination with the running-gear of a vehicle, of front and rear transverse bumpers yieldingly secured for longitudinal movement to the running-gear, parallel side guards pivoted to the bumpers and capable of lateral movement and extending inwardly therefrom substantially in the plane of the axis of the wheels of the running-gear having their inner free ends detachably secured for longitudinal movement to the running-board of the vehicle, the forward side-guards being provided with impact members opposite the hubs of the wheels.

8. The combination with the running-gear of a vehicle, of front and rear transverse bumpers yieldingly secured for longitudinal movement to the running-gear, parallel side guards pivoted to the bumpers and capable of lateral movement and extending inwardly therefrom substantially in the plane of the axis of the wheels of the running-gear having their inner free ends detachably secured for longitudinal movement to the running-board of the vehicle, the forward side guards being provided with impact members opposite the hubs of the wheels, and shields carried by the guards adapted to cover a portion of the wheels, said side guards capable of longitudinal movement relative to the shields.

9. A guard for vehicles comprising a transverse bumper extending transversely thereof at the forward end of the machine, and parallel side guards pivoted thereto capable of lateral movement and secured at their inner ends for longitudinal movement to the side of the machine.

10. A guard for vehicles comprising a transverse bumper extending transversely thereof at the forward end of the machine, and parallel side guards pivoted thereto capable of lateral movement and secured at their inner ends for longitudinal movement to the side of the machine, and impact members carried by said side guards opposite the hubs of the wheels.

In testimony whereof I affix my signature.

ROBERT S. CLARY.